(12) United States Patent
Seres et al.

(10) Patent No.: US 12,347,316 B2
(45) Date of Patent: Jul. 1, 2025

(54) SYSTEM AND METHOD FOR PROVIDING WELL DISTINGUISHABLE WARNING LEVELS FOR OBSTACLES IN DIFFERENT VISIBILITY AREAS IN THE VICINITY OF A VEHICLE

(71) Applicant: KNORR-BREMSE Systeme fuer Nutzfahrzeuge GmbH, Munich (DE)

(72) Inventors: Gabor Seres, Munich (DE); Benedek Szücs, Munich (DE); Mate Kovacs-Nagy, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 42 days.

(21) Appl. No.: 18/451,045

(22) Filed: Aug. 16, 2023

(65) Prior Publication Data

US 2024/0078906 A1 Mar. 7, 2024

(30) Foreign Application Priority Data

Sep. 6, 2022 (EP) .................................... 22194055

(51) Int. Cl.
*G08G 1/16* (2006.01)
(52) U.S. Cl.
CPC .................................... *G08G 1/16* (2013.01)
(58) Field of Classification Search
CPC .................................................... G08G 1/16
See application file for complete search history.

(56) References Cited

U.S. PATENT DOCUMENTS

| | | | | |
|---|---|---|---|---|
| 6,894,608 B1* | 5/2005 | Gunderson | ............ | B60Q 1/525 340/471 |
| 7,557,691 B2* | 7/2009 | Iwama | ..................... | G01S 11/12 340/436 |
| 8,547,298 B2* | 10/2013 | Szczerba | ............... | G01S 13/867 340/436 |
| 8,645,001 B2* | 2/2014 | Basson | .................. | B60Q 9/008 701/1 |
| 9,487,139 B1* | 11/2016 | Ishida | .................... | B60W 30/08 |
| 10,139,829 B1* | 11/2018 | Mariet | ................ | G08G 1/0962 |
| 11,167,774 B2* | 11/2021 | Furtado | .................. | B60K 35/28 |
| 11,745,754 B2* | 9/2023 | Maruyama | ............ | B60W 50/14 340/435 |
| 12,065,137 B2* | 8/2024 | Aitidis | .............. | B60W 30/0953 |
| 2005/0195383 A1* | 9/2005 | Breed | ..................... | G01S 7/481 356/28 |

(Continued)

FOREIGN PATENT DOCUMENTS

DE 102011083780 A1 4/2013
EP 4005889 A1 6/2022

(Continued)

*Primary Examiner* — Chico A Foxx
(74) *Attorney, Agent, or Firm* — NORTON ROSE FULBRIGHT US LLP

(57) ABSTRACT

A driver assistance system for a vehicle and a method are provided, being adapted to provide alerts to a driver in certain situations, e.g. if a foreign object is invisible for the driver or if there is an increased danger for a collision. The alert level is adapted to depend on the position and/or the direction of movement of the at least one foreign object and/or the direction of movement of the vehicle, which are measured by at least one sensor.

13 Claims, 3 Drawing Sheets

(56) References Cited

U.S. PATENT DOCUMENTS

| | | | |
|---|---|---|---|
| 2009/0063053 A1* | 3/2009 | Basson | G08G 1/167 |
| | | | 702/1 |
| 2010/0082679 A1* | 4/2010 | Ekberg | G06F 21/6218 |
| | | | 707/783 |
| 2012/0268269 A1* | 10/2012 | Doyle | G08B 21/22 |
| | | | 340/539.13 |
| 2014/0111324 A1* | 4/2014 | Lisseman | B60K 35/00 |
| | | | 74/552 |
| 2016/0121794 A1* | 5/2016 | Iguchi | B60R 11/04 |
| | | | 345/7 |
| 2016/0375900 A1* | 12/2016 | Laur | B60T 7/12 |
| | | | 701/41 |
| 2017/0247031 A1* | 8/2017 | Feit | G01S 13/931 |
| 2018/0297590 A1* | 10/2018 | Kang | B60W 30/143 |
| 2020/0084419 A1* | 3/2020 | Shimotsuma | H04N 21/647 |
| 2022/0032945 A1* | 2/2022 | Schumacher | B60K 35/23 |
| 2022/0080888 A1* | 3/2022 | Hayashi | G08G 1/165 |
| 2022/0169176 A1* | 6/2022 | Coudre | B60K 35/26 |
| 2022/0392338 A1* | 12/2022 | Boysen | G08G 1/005 |

FOREIGN PATENT DOCUMENTS

| | | | | |
|---|---|---|---|---|
| EP | 4049877 A1 | 8/2022 | | |
| KR | 20110006919 A | * | 1/2011 | |
| WO | WO-0185491 A1 | * | 11/2001 | B60Q 9/008 |

* cited by examiner ature of the present invention are subject-matter of the further descriptions herein.

SYSTEM AND METHOD FOR PROVIDING WELL DISTINGUISHABLE WARNING LEVELS FOR OBSTACLES IN DIFFERENT VISIBILITY AREAS IN THE VICINITY OF A VEHICLE

RELATED APPLICATION INFORMATION

The present application claims priority to and the benefit of European Patent Application No. EP 22194055.4, which was filed in Europe on Sep. 6, 2022, the disclosure which is incorporated herein by reference.

FIELD OF THE INVENTION

The present invention relates to a system and method for providing well distinguishable warning levels for obstacles in different visibility areas in the vicinity of a vehicle.

BACKGROUND INFORMATION

Driver assistant systems are commonly used for the autonomous operation of a vehicle, which is of increasing importance in the last years. These systems usually use a human-machine interface to inform the driver about alerts, for example dangers originating from other vehicles. These systems typically use different kind of warnings (e.g. visual, acoustical, or haptic warnings). With these multiple warning types, the systems can define different levels of warnings, based on the severity of the situation. For the creation of alerts and warnings, the detection of the area surrounding the vehicle is of specific importance; said detection is usually performed via different sensors, e.g. radar systems, cameras and the like.

Patent document DE 10 2011 083 780 A1 discusses a method for warning of collisions with obstacles for a vehicle and a respective collision warning system. A control unit is used to evaluate vehicle information which indicate the position of at least one of at least one obstacle in the environment of the vehicle. An output system is further provided for outputting a plurality of types of collision types of collision warnings to the driver of the vehicle in the presence of an obstacle in the vicinity of the vehicle.

However, various warnings can be provided by a driver assistance system, and the warnings must not overstrain the driver's attention. In particular, irrelevant warnings might distract the driver from relevant warnings. That is especially true for acoustical and haptic warnings that usually indicate dangerous situations to the driver. If the number of warnings is too high, the driver might not be able to fully react to all warnings, and will then deactivate the driver assistance system partially or fully.

Therefore, it is important to define well distinguishable and informative warnings for the driver, so that higher level warnings are only output when the situation really demands such warnings.

SUMMARY OF THE INVENTION

It is therefore a technical problem of the present invention to prevent a driver-friendly system which provides collision warnings to a driver, however avoiding unnecessary disturbance of the driver.

The technical problem may be solved by a driver assistance system according to the description herein and a method according to the description herein. Exemplary embodiments of the present invention are subject-matter of the further descriptions herein.

A driver assistance system for a vehicle according to the present invention includes: At least one sensor which is adapted to monitor the vicinity of the vehicle, a control unit which is adapted to process data of the at least one sensor to identify at least one potential foreign object, an alert unit which is adapted to alert the driver of the vehicle in case of a potential collision with the foreign object, wherein the alert unit is adapted to select and output different levels of an alert, wherein the alert level depends on the position, the motion and/or the direction of movement of the at least one foreign object and/or the motion (e.g. velocity) and/or direction of movement of the vehicle.

By a driver assistance system working like this, unnecessary disturbance for the driver can be prevented, as the system is able to handle separate alert levels for objects that are located in different positions.

Hence, the driver assistance system can react to the position and/or the direction of movement of the vehicles, and can change the alert level, wherein a high alert level might not be needed for vehicles or other objects that are far away, but might be of an importance for objects that are very close to the vehicle.

The alert unit may be adapted to output a low level alert for a foreign object which is visible for the driver, and output a high level alert for an object which is invisible for the driver.

A low level alert can hence be provided for objects that can be observed by the driver as well, where no driver assistance system is really necessary. By such alerts, a driver is less distracted, and the driver might not be frightened by a loud acoustic signal or the like. However, for objects that are invisible by the driver, for example because they are in a blind spot, a high level alert can be provided in order to raise the driver's attention to the object which is invisible for him.

Hence, several times of condition warnings can be output to the driver, depending in which visible region of the driver a potential collision might occur.

The alert unit may be adapted to also output a medium level alert for a foreign object being indirectly visible for the driver, for example by a mirror.

For such case, the driver might not notice a foreign object, for example another approaching vehicle, immediately, and hence it is useful to provide at least some type of alert.

Further, a high level alert may include a visual alert of higher intensity compared to low level alert, so that the driver can distinguish between different alert levels more easily.

The driver assistance system may be adapted to provide an additional flashing visual, acoustic and/or haptic, and/or vibration alert if there is an increased danger of a collision with at least one potential foreign object based on the data of the at least one sensor.

By such configuration, flashing visual, acoustic or haptic alerts, which might frighten the driver, are only provided in situations when it is really necessary, in particular if a collision might be likely, as a foreign object is for example in a blind spot.

The alert unit may include a display unit, which is adapted to provide visual alerts to a driver of the vehicle, and/or an acoustic and/or a vibration alarm apparatus or device.

In such display unit, all alerts can be bundled, and the driver only has to focus on one display with regard to collision alerts.

More particularly, the display unit may include a right-side intensity indicator, which is adapted to indicate a potential collision with a foreign object on the right side of the vehicle, and a left-side intensity indicator, which is adapted to indicate potential collisions with one object on the left side of the vehicle.

By such distinction within the display unit, the driver can very easily recognize potential collision dangers by the presence of foreign objects, additionally more fast.

More particularly, the right-side intensity indicator and/or the left-side intensity indicator may be adapted to display different levels of an alert on the respective side of the vehicle. This makes the recognition of potential dangers for a driver even easier.

Similarly, this can be provided also in a front-side intensity indicator and a back-side intensity indicator.

The at least one sensor may be a camera, a radar sensor, a lidar sensor or a motion sensor.

Such sensors can be provided at different positions on the car, which may be adapted to observe an area which is as big as possible. At least one of the sensors may be adapted to monitor a position and/or moving direction of a foreign object. More particularly, at least one of the sensors may also be adapted to monitor a direction of movement of the vehicle.

A method for warning of potential collisions of a vehicle with at least one foreign object according to the present invention includes: A monitoring of the vicinity of the vehicle by at least one sensor, wherein a control unit processes data of the at least one sensor and evaluates object information for at least one foreign object, wherein the object information includes the position, the motion (e.g. velocity) and/or the direction of movement of at least one foreign object in the vicinity of the vehicle, in particularly in relation to the vehicle. An alert unit is adapted to select and output different levels of an alert, the alert level depending on the position and/or the direction of movement of at least one foreign object and/or the direction of movement of the vehicle.

By such method, the alert level can be fine-tuned by the position of a foreign object, and in particular with the probability for a collision with such object. Furthermore, it can be determined whether a foreign object in certain positions can be recognized by a driver (without the driver assistance system), and the alert is also dependent on this issue.

A low level alert may be output if a foreign object is visible for the driver, and a high level alert is output if a foreign object is invisible for the driver, and optionally a medium level alert is output if a foreign object is indirectly visible for the driver (for example by a mirror).

A low level alert can hence be provided for objects that can be observed by the driver as well, where no driver assistance system is really necessary, but for objects that are invisible by the driver, for example because they are in a blind spot, a high level alert can be provided in order to raise the driver's attention to the object which is invisible for him.

High level alert may include a visual alert of high intensity compared to a low level alert.

An additional flashing visual, acoustic and/or haptic alert may be provided if there is an increased danger of a collision with at least one potential foreign object based on the data of the at least one sensor.

By such configuration, visual or haptic alerts, which might frighten the driver, are only provided in situations when it is really necessary, in particular if the driver cannot see a foreign object with which a collision might be likely, for example as being in a blind spot.

In the following, exemplary embodiments of the present invention are explained more in detail by the attached figures.

DETAILED DESCRIPTION

Figure 1:
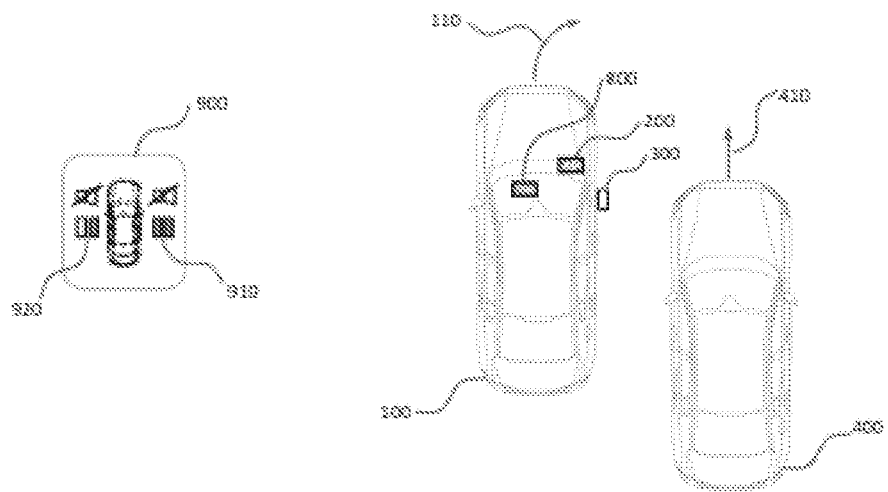
FIG. 1 shows a vehicle and foreign object (which is also a vehicle), and further a scheme of a display unit within the vehicle.

FIG. 1 shows a vehicle 100, comprising a sensor 300, a control unit 200, and an alert unit 800. Furthermore, the moving direction 110 of the vehicle 100 is indicated. Furthermore, a scheme of the display unit 900 is shown in FIG. 1, wherein a right-side intensity indicator 110 and a left-side intensity indicator 920 are present in the display unit 900. In the present configuration, the moving direction 110 of the vehicle is curved to the right. Furthermore, a foreign object 400 is shown, which is also a vehicle. The driving direction 410 of the foreign object 400 is straight forward. When the vehicle 100 and the foreign object 400 are driving further, a collision might occur with increased danger, as the moving direction 110 of the vehicle and the moving direction 410 of the foreign object 400 will cross at some point. The foreign vehicle 400 is visible for the driver of the vehicle 100. In the display unit, on the left-side intensity indicator 920, a low intensity warning is shown, whereas on the ride-side intensity indicator 910, a high intensity warning is shown, however without an acoustic collision warning.

Figure 2:
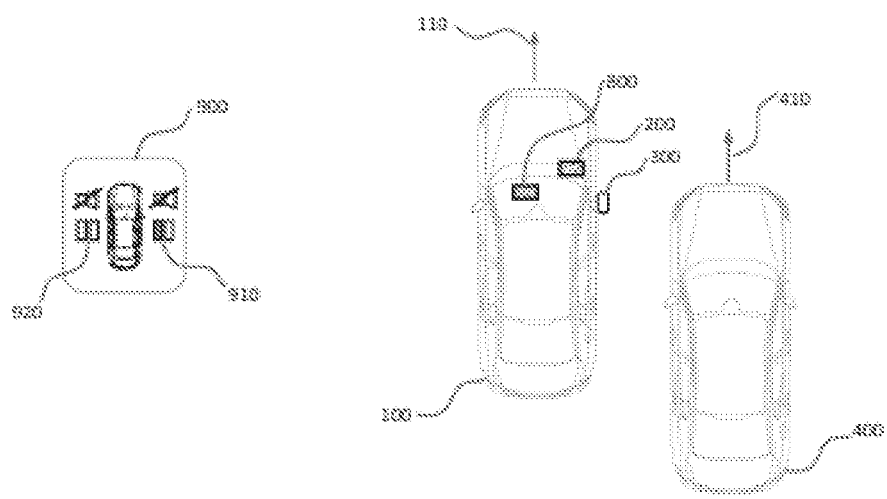
FIG. 2 shows a vehicle and a foreign vehicle, wherein the foreign vehicle is visible for the driver of the vehicle and a collision is unlikely.

FIG. 2 shows a situation where the moving direction 110 of one vehicle 100 and the moving direction 410 of the foreign object 400 are parallel, hence there is no acute danger of collision. Hence, no visual warning is provided in the left-side intensity indicator 920, and only a low level alert is provided on the right-side intensity indicator 910 due to the visibility of the foreign object 400. No acoustic warning is provided.

Figure 3:
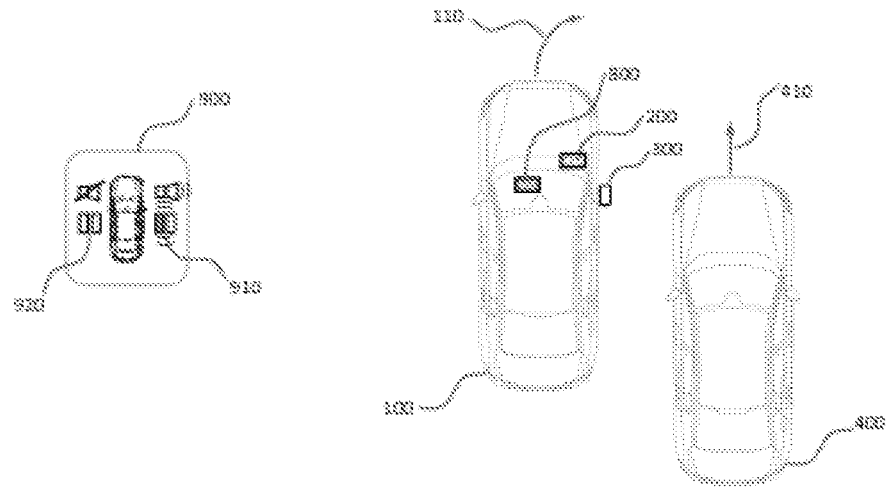
FIG. 3 shows a vehicle and a foreign vehicle, wherein the foreign vehicle is in the visible area of the driver of the vehicle, wherein a collision is possible.

FIG. 3 shows a situation where the vehicle 100 has a moving direction 110 which is curved left, and the foreign object 400, e.g. the other vehicle, has a straight forward moving direction. Hence, a collision is likely. On the left-side intensity indicator 920, no warning is provided. On the right-side intensity indicator 910, a low-level flashing visual alert is provided, and furthermore, an acoustic alert is provided. The foreign object 400 is visible for the driver of the vehicle 100—hence, the flashing and acoustic warning are provided because of an increased collision danger, but the low-level alert is provided due to the visibility of the foreign object 400 for the driver.

Figure 4:
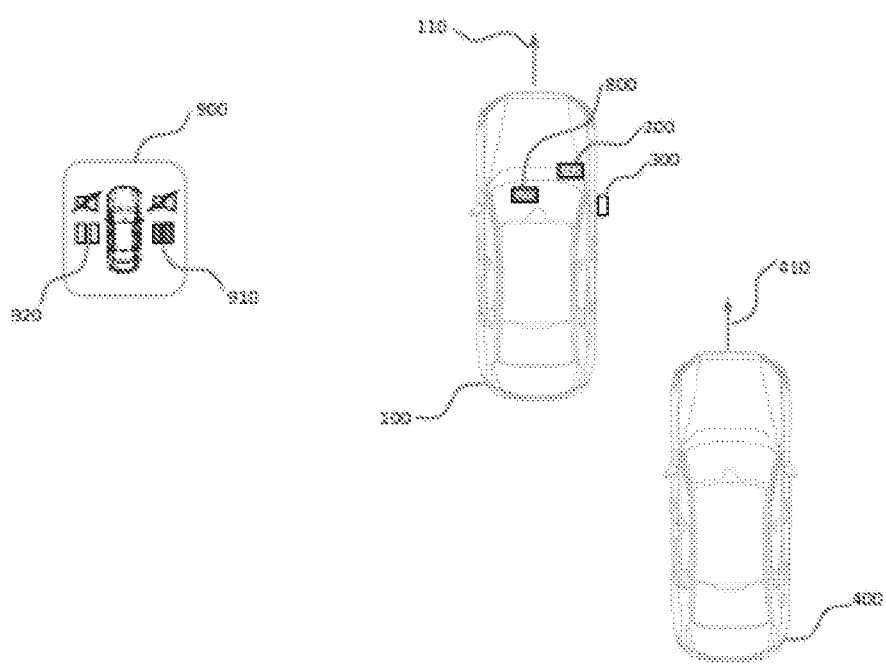
FIG. 4 shows a vehicle and a foreign vehicle, wherein the foreign vehicle is in the non-visible area of the driver of the vehicle, and a collision is unlikely.

In FIG. 4, a situation is shown where the moving direction 110 of the vehicle 100 and the moving direction 410 of the foreign object 400 are about parallel. Furthermore, the driver of the vehicle 100 cannot see the foreign object 400. Hence, on the left-side intensity indicator 920, no alert is provided, whereas on the right-side intensity indicator of the vehicle, a high level warning alert is provided (doe to the non-visibility of the foreign object 400 for the driver).

Figure 5:
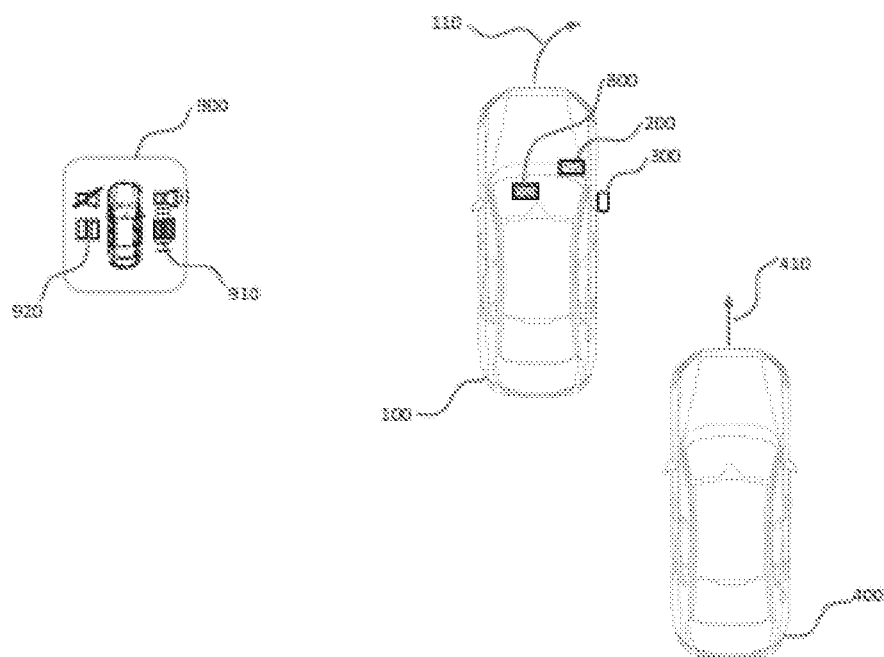
FIG. 5 shows a vehicle and a foreign vehicle, wherein the foreign vehicle is in the non-visible area of the vehicle, and a collision between the vehicle and the foreign vehicle is possible.

FIG. 5 shows the situation where the moving direction 110 of the vehicle 100 is curved to the right, whereas the moving direction 410 of the foreign object 400 is straight forward. Hence, a collision is likely. Furthermore, the foreign object 400 is not visible for the driver of the vehicle 100. Hence, in the left-side intensity indicator 920, no warning is provided, whereas a flashing high level alert is provided on the right-side intensity indicator 910, and furthermore, an acoustic alert is provided.

Hence, it can be followed that an acoustic warning and a flashing visual warning are only provided if a collision is likely. Furthermore, specific visual warnings (high level alert) are provided if the driver of the vehicle 100 does not see the foreign object 400, i.e. the foreign object 400 is in the non-visible are of the driver. If it is visible, a low-level alert is provided. In the display 900, there are two boxes in the right-side intensity indicator 910 and the left-side intensity indicator 920. One of these boxes being lighted means a low level alert, and two of these boxes being lighted means a high level alert.

The present invention is not limited to the embodiments as described above.

The display 900 can look differently, the display unit 900 can also only consist of lights or LEDs. Furthermore, different alerts (optic, acoustic, haptic) can be provided in different combinations.

In addition, or alternative, other alarms can be provided, e.g. a vibration alarm at the steering wheel so that the driver will be made aware of the alerts. Or, further in addition or alternative, a voice alarm can be used, wherein a voice talks to the driver drawing his attention to the alerts.

A driver assistance system 1 for a vehicle 100 and a method are provided, being adapted to provide alerts to a driver in certain situations, e.g. if a foreign object 400 is invisible for the driver or if there is an increased danger for a collision. The alert level is adapted to depend on the position and/or the direction of movement 410 of the at least one foreign object 400, which are measured by at least one sensor 300.

THE LIST OF REFERENCE SIGNS IS AS FOLLOWS

1 Driver assistance system
100 vehicle
110 moving direction of vehicle
200 control unit
300 sensor
400 foreign object
410 moving direction of foreign object
800 alert unit
900 display unit
910 right-side intensity indicator
920 left-side intensity indicator

What is claimed is:

1. A driver assistance system for a vehicle, comprising:
at least one sensor to monitor a vicinity of the vehicle;
a control unit to process data of the at least one sensor to identify a foreign object; and
an alert unit to alert a driver of the vehicle in case of a potential collision with the foreign object;
wherein the alert unit is adapted to select and output different levels of an alert, wherein the alert level depends on: (i) a position of the foreign object, and/or a motion of the foreign object, and/or a direction of movement of the foreign object, and (ii) a motion of the vehicle and/or direction of movement of the vehicle;
wherein the alert unit is adapted to output a low level alert when the foreign object is visible to the driver, to output a high level alert when the foreign object is invisible to the driver, and to output a medium level alert when the foreign object is indirectly visible to the driver.

2. The driver assistance system of claim 1, wherein the high level alert includes a visual alert of higher intensity compared to the low level alert.

3. The driver assistance system of claim 2, wherein driver assistance system is adapted to provide an additional flashing visual alert and/or an acoustic alert and/or a haptic alert and/or a vibration alert when there is an increased danger of a collision with the foreign object based on the data of the at least one sensor.

4. The driver assistance system of claim 1, wherein the alert unit includes a display unit to provide visual alerts to a driver of the vehicle and/or an acoustic alarm device and/or a vibration alarm device.

5. The driver assistance system of claim 4, wherein the display unit includes a right-side intensity indicator to indicate potential collisions with foreign objects on the right side of the vehicle, and a left-side intensity indicator to indicate potential collisions with foreign objects on the left side of the vehicle.

6. The driver assistance system of claim 5, wherein the right-side intensity indicator and/or the left-side intensity indicator are adapted to display different levels of an alert on the respective side of the vehicle.

7. The driver assistance system of claim 1, wherein the at least one sensor includes a camera, a radar sensor, a lidar sensor or a motion sensor.

8. A method for warning of potential collisions of a vehicle with at least one foreign object, the method comprising:
monitoring a vicinity of the vehicle by at least one sensor; and
processing, via a control unit, data of the at least one sensor and evaluating object information of a foreign object in the vicinity of the vehicle, wherein the object information includes a position of the foreign object and/or a motion of the foreign object and/or motion direction of the foreign object,
wherein an alert unit is adapted to select and output different levels of an alert, wherein the alert level depends on: (i) the position of the foreign object and/or the direction of movement of the foreign object, and (ii) a direction of movement of the vehicle;
wherein the alert unit is adapted to output a low level alert when the foreign object is visible to the driver, to output a high level alert when the foreign object is invisible to the driver, and to output a medium level alert when the foreign object is indirectly visible to the driver.

9. The method according to claim 8, wherein the high level alert includes a visual alert of higher intensity compared to the low level alert.

10. The method according to claim 9, wherein an additional flashing visual alert and/or an acoustic alert and/or haptic alert, is provided when there is an increased danger of a collision with at least one potential foreign object based on the data of the at least one sensor.

11. The method according to claim 8, wherein the alert unit includes a display unit providing visual alerts to a driver of the vehicle.

12. The method according to claim 11, wherein the display unit includes a right-side intensity indicator, which indicates potential collisions with foreign objects on the right side of the vehicle, and a left-side intensity indicator, which indicates potential collisions with foreign objects on the left side of the vehicle.

13. The driver assistance system of claim 1, wherein the alert unit is adapted to output the medium level alert, when the foreign object is indirectly visible via a mirror to the driver.

\* \* \* \* \*